United States Patent
Komatsu et al.

(10) Patent No.: US 10,106,122 B2
(45) Date of Patent: Oct. 23, 2018

(54) FOLDING PREPARATION BODY OF DRIVER SEAT AIRBAG AND FOLDING METHOD OF FOLDED BODY

(71) Applicant: TOYODA GOSEI CO., LTD., Kiyosu-shi, Aichi-ken (JP)

(72) Inventors: Takanori Komatsu, Kiyosu (JP); Toshihito Yanagisawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/408,487

(22) Filed: Jan. 18, 2017

(65) Prior Publication Data

US 2017/0210331 A1 Jul. 27, 2017

(30) Foreign Application Priority Data

Jan. 21, 2016 (JP) .................................. 2016-010125

(51) Int. Cl.
*B60R 21/237* (2006.01)
*B60R 21/203* (2006.01)
*B60R 21/2338* (2011.01)
*B60R 21/235* (2006.01)

(52) U.S. Cl.
CPC .......... *B60R 21/237* (2013.01); *B60R 21/203* (2013.01); *B60R 21/235* (2013.01); *B60R 21/2338* (2013.01); *B60R 2021/23509* (2013.01); *B60R 2021/23538* (2013.01)

(58) Field of Classification Search
CPC . B60R 21/237; B60R 21/2338; B60R 21/203; B60R 21/235; B60R 2021/23538; B60R 2021/23509

See application file for complete search history.

(56) References Cited

U.S. PATENT DOCUMENTS

| | | | | |
|---|---|---|---|---|
| 5,529,339 A | * | 6/1996 | Niederman | B60R 21/237 280/731 |
| 5,681,052 A | * | 10/1997 | Ricks | B60R 21/237 280/731 |
| 6,007,088 A | * | 12/1999 | Yamamoto | B60R 21/217 280/728.3 |

(Continued)

FOREIGN PATENT DOCUMENTS

| | | |
|---|---|---|
| JP | 2000-247175 A | 9/2000 |
| JP | 2007-261565 A | 10/2007 |
| WO | 2015/044117 A1 | 4/2015 |

*Primary Examiner* — Darlene P Condra
(74) *Attorney, Agent, or Firm* — Posz Law Group, PLC

(57) ABSTRACT

A folding preparation body includes a pre-folded portion folded in a folded shape of being gathered to an upper side of the inflow opening and mounted in the steering wheel, the pre-folded portion includes a portion in which the front edge of the initial preparation body is folded to approach the inflow opening in the vehicle body side wall, the vehicle body side wall of the folding preparation body includes a non-folded portion from the inflow opening to a crease of the pre-folded portion and a folded portion which is folded from the crease to be overlapped on the lower surface of the non-folded portion, and the pre-folded portion includes the folded portion of the vehicle body side wall and a lower surface side portion, which covers an outer surface of the folded portion, in the cover portion of the driver side wall.

3 Claims, 16 Drawing Sheets

(56) References Cited

U.S. PATENT DOCUMENTS

| | | | |
|---|---|---|---|
| 7,631,892 B2 * | 12/2009 | Ishikawa | B60R 21/237 280/728.1 |
| 2004/0239085 A1 * | 12/2004 | Vitet | B60R 21/237 280/731 |
| 2005/0269807 A1 | 12/2005 | Jenkins et al. | |
| 2006/0113776 A1 * | 6/2006 | Iida | B60R 21/233 280/731 |
| 2010/0090446 A1 * | 4/2010 | Choi | B60R 21/2035 280/728.2 |
| 2010/0289253 A1 * | 11/2010 | Washino | B60R 21/201 280/728.3 |
| 2013/0017942 A1 * | 1/2013 | Ko | B60R 21/237 493/405 |

* cited by examiner ary application is based upon and claims the benefit of # FOLDING PREPARATION BODY OF DRIVER SEAT AIRBAG AND FOLDING METHOD OF FOLDED BODY

CROSS-REFERENCE TO RELATED APPLICATION(S)

This application is based upon and claims the benefit of priority from Japanese Patent Application No. 2016-010125, filed on Jan. 21, 2016, the entire contents of which are incorporated herein by reference.

BACKGROUND

1. Field of the Invention

The present invention relates to a folding preparation body of a driver seat airbag which can be mounted compactly in a steering wheel of a vehicle, and a folding method of a folded body.

2. Description of the Related Art

In the related art, a steering wheel in which such a driver seat airbag is mounted includes a ring portion which is gripped when steering, a boss portion which is disposed near the center of the ring portion, and a spoke portion which connects the boss portion and the ring portion while a gap is provided on the front side of the boss portion when steering straight ahead. A folded body obtained by folding an airbag is mounted in the boss portion of the steering wheel (for example, see JP-A-2007-261565). In the airbag, an outer circumferential wall includes a vehicle body side wall having an inflow opening through which an inflation gas is allowed to flow disposed near the center thereof, and a driver side wall which is disposed to face the vehicle body side wall by connecting an outer circumferential edge to the outer circumferential edge of the vehicle body side wall. In order to be compact, the folded body of the airbag is formed in such a folded shape that the outer circumferential edge of an initial preparation body in a state where the driver side wall and the vehicle body side wall in the outer circumferential wall of the airbag are overlapped is gathered to the upper side of the inflow opening.

The outer circumferential edge of the initial preparation body in a state where the driver side wall and the vehicle body side wall in the outer circumferential wall of the airbag are overlapped is folded using a plurality of radial paddles and the like to be gathered to the upper side of the inflow opening, and a folded portion obtained by roll-bending and folding toward the vehicle body side wall is provided on the front edge side, thereby forming the folded body (for example, see US 2005/0269807). In the folded body having such a configuration, although a driver is too close to the boss portion at the time of inflation after the steering wheel is mounted in the boss portion, a portion of the folded portion on the front edge side enters the front portion of the boss portion between the boss portion and the ring portion to be inflated on the lower surface side of the ring portion, and thus the pressing force to the close driver can be reduced.

However, in the conventional folded body of the driver seat airbag, the rolled folded portion is provided on the front edge side as disclosed in US 2005/0269807 corresponding to the close driver, and the rolled folded portion has rigidity so that it is hardly bent. Further, although a technology of approaching the inflow opening in JP-A-2007-261565 is applied to fold the folded body compactly, the rigidity of the rolled folded portion inhibits the folded body from being folded compactly.

SUMMARY

The invention is made to solve the above-described problem, and an object thereof is to provide a folding preparation body of a driver seat airbag which can be mounted compactly and a folding method of a folded body.

According to an aspect of the invention, there is provided a folding preparation body of a driver seat airbag which is mounted in a steering wheel and includes an outer circumferential wall having a vehicle body side wall in which an inflow opening through which an inflation gas is allowed to flow is disposed near a center, and a driver side wall disposed to face the vehicle body side wall by connecting an outer circumferential edge to an outer circumferential edge of the vehicle body side wall, the folding preparation body including: a pre-folded portion that is provided in a front edge of an initial preparation body of the airbag in a state where the vehicle body side wall and the driver side wall are overlapped with each other, the folding preparation body being folded in a folded shape of being gathered to an upper side of the inflow opening and mounted in the steering wheel, wherein: the pre-folded portion includes a portion in which the front edge of the initial preparation body is folded to approach the inflow opening in the vehicle body side wall; the vehicle body side wall of the folding preparation body includes, on a front side of the inflow opening, a non-folded portion from the inflow opening to a crease of the pre-folded portion, and a folded portion which is folded from the crease to be overlapped on the lower surface of the non-folded portion; the driver side wall of the folding preparation body includes, on a front side, a cover portion which has a J-shape in sectional view and covers an outer surface of the non-folded portion and the folded portion; and the pre-folded portion includes the folded portion of the vehicle body side wall and a lower surface side portion, which covers an outer surface of the folded portion, in the cover portion of the driver side wall.

The folding preparation body according to the invention is configured such that the pre-folded portion includes the folded portion of the vehicle body side wall obtained by folding the front edge of the initial preparation body to approach the inflow opening in the vehicle body side wall, and the lower surface side portion which covers the outer surface of the folded portion in the cover portion of the driver side wall. In other words, the pre-folded portion is formed in such a manner that the front edge of the initial preparation body is folded to approach the inflow opening of the vehicle body side wall, and only one crease is provided in a right and left direction.

For this reason, the folding preparation body includes the pre-folded portion on the front edge side. However, the pre-folded portion is formed by simply folding once the overlapped vehicle body side wall and driver side wall of the initial preparation body without rolling. The front edge of the folding preparation body provided with the pre-folded portion is in a state where each of the driver side wall and the vehicle body side wall are overlapped with each other by two walls, that is, total four walls are simply superimposed in a plane shape, thereby suppressing the increase of rigidity to the utmost. As a result, although the folding preparation body includes the pre-folded portion, the bendability of the folding preparation body can be maintained. When the portion of the folding preparation body near the inflow opening is folded to be gathered to the upper side of the inflow opening, the folding can be performed smoothly to easily form the folded body with a compact folded shape.

On the other hand, the pre-folded portion is formed by being folded to the lower surface of the folding preparation body, and the folded body folded to be gathered to the upper side of the inflow opening is mounted in the boss portion of the steering wheel. Even when the airbag is inflated in a state where the driver is close to the boss portion, the pre-folded portion enters the gap between the boss portion and the ring portion on the front side of the boss portion to be inflated in the lower surface of the ring portion, thereby reducing the pressing force to the close driver.

Therefore, in the folding method of the folding preparation body and the folded body of the driver seat airbag according to the invention, the folding can be performed without inhibiting the compactness, and when the driver seat airbag is inflated after mounting in the steering wheel, the pressing force applied to the driver being close to the steering wheel can be reduced.

In the folding method of the folded body of the driver seat airbag according to the invention, when the portion of the folding preparation body near the inflow opening is gathered to the upper side of the inflow opening, the folding preparation body is desirably pressed and folded such that a plurality of places of the outer circumferential edge of the folding preparation body approach the inflow opening.

When the folding is performed as described above, a plurality of places of the outer circumferential edge of the folding preparation body approach the inflow opening. Thus, the portion of the folding preparation body near the inflow opening is gathered equally to the upper side of the inflow opening, and the folding is performed without providing a portion protruding partially upward. Therefore, the compact folded body which is mountable in a mounting portion of a small space can be easily obtained.

In the folding method of the folded body of the driver seat airbag according to the invention, when the portion of the folding preparation body near the inflow opening is gathered to the upper side of the inflow opening, the folding preparation body is desirably pressed and folded such that a portion of the crease of the folding preparation body approaches the inflow opening.

When the folding is performed as above, the portion itself of the crease approaches the inflow opening, and thus the folding preparation body can be folded to be the more compact folded body. Of course, the pre-folded portion is not rolled, and is not difficult to be bent, and thus the portion itself of the crease can approach smoothly the inflow opening.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
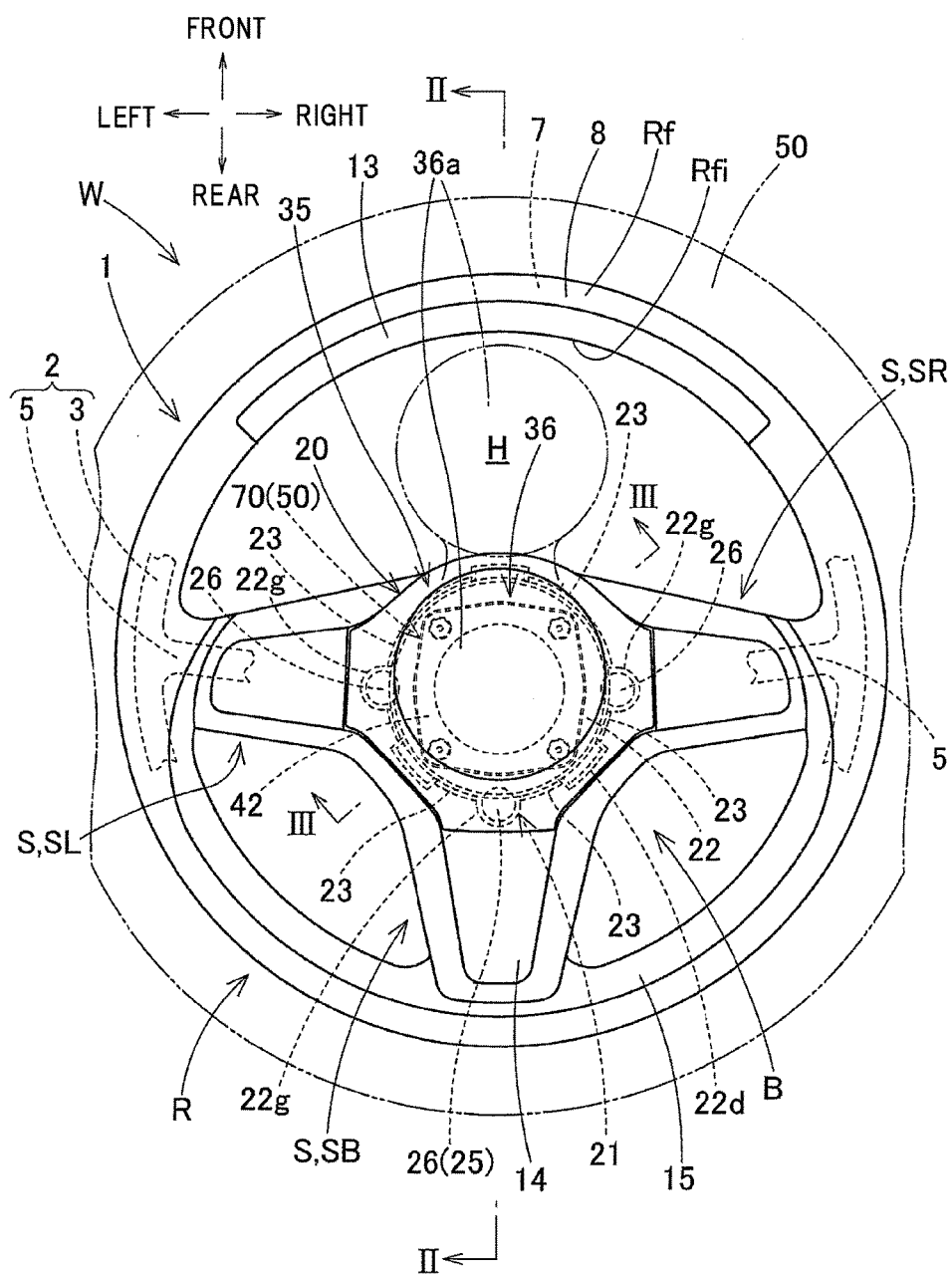
FIG. 1 is a plan view schematically illustrating a steering wheel in which a folded body obtained by folding a folding preparation body of a driver seat airbag according to one embodiment of the invention is mounted.
Figure 2:
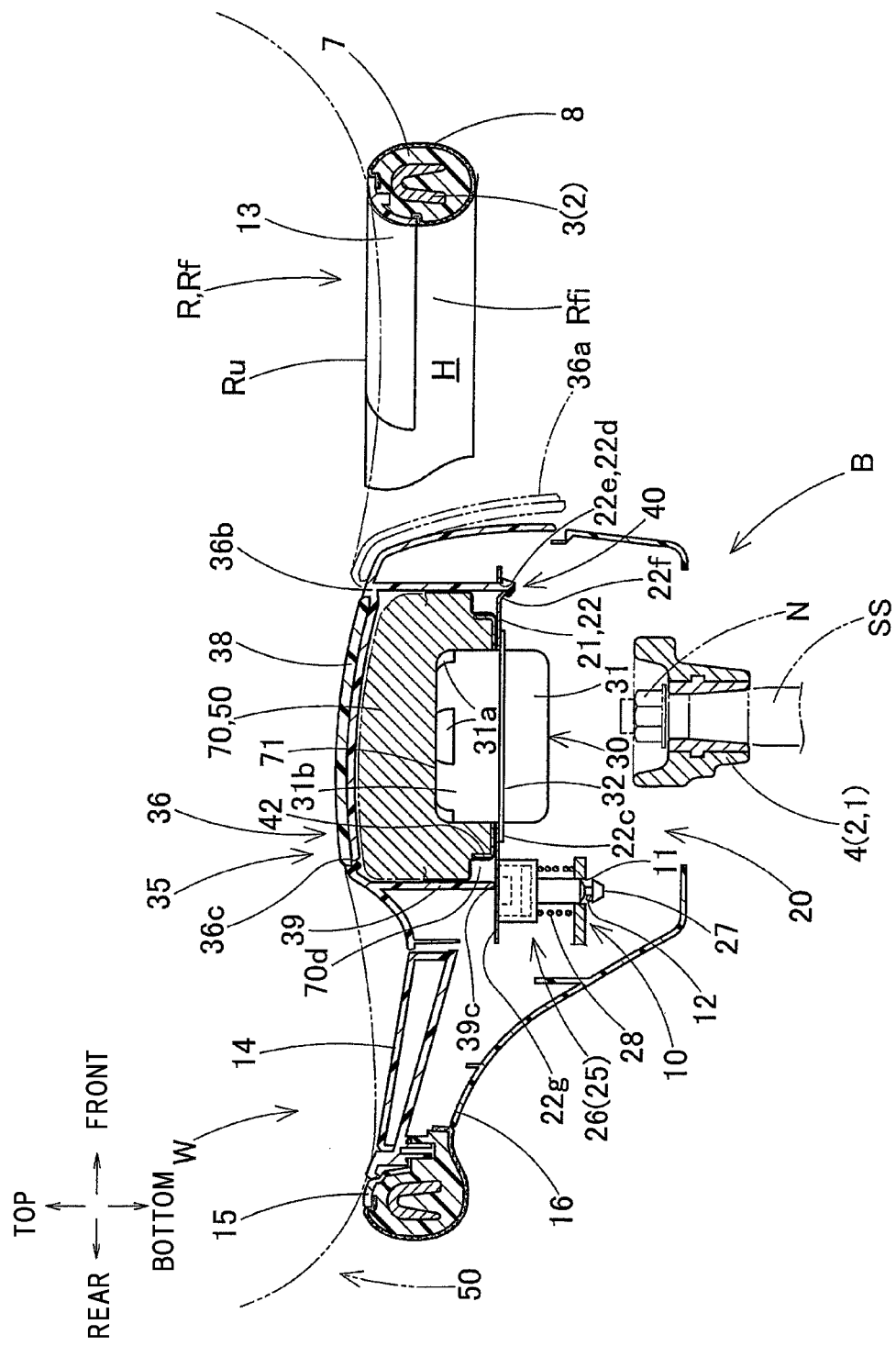
FIG. 2 is a longitudinal sectional view schematically illustrating the steering wheel in which the folded body of the driver seat airbag of the embodiment is mounted, and corresponds to II-II portion of FIG. 1.
Figure 3:
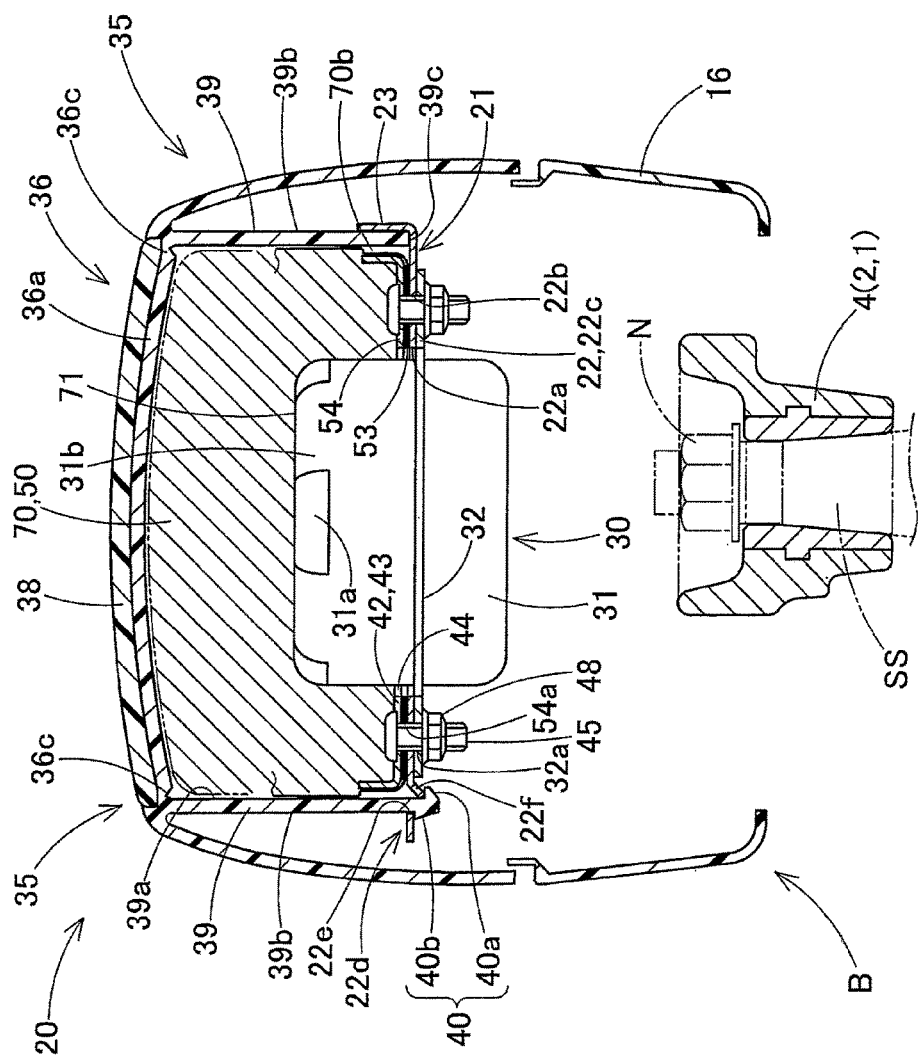
FIG. 3 is a longitudinal sectional view schematically illustrating the steering wheel in which the folded body of the embodiment is mounted, and corresponds to III-III portion of FIG. 1.

Hereinafter, as illustrated in FIGS. 1 to 3, one embodiment of the invention is described on the basis of the drawings. A driver seat airbag 50 of the embodiment is used in a driver seat airbag device 20 fixedly attached to a boss portion B of a steering wheel W. The driver seat airbag 50 is mounted in the boss portion B by using an airbag holder 21 (to be described) of the airbag device 20. As illustrated in FIGS. 1 and 2, the steering wheel W includes a steering wheel body 1 having an annular ring portion R gripped when steering, the boss portion B disposed in the center of the ring portion R, and a spoke portion S connecting the ring portion R and the boss portion B, and the airbag device 20 disposed in the upper portion of the boss portion B.

In this specification, a vertical direction, a right-left direction, and a front-rear direction of the airbag device 20, the airbag 50, the steering wheel W, and the like are based on when a vehicle is steered straight ahead in a state where the steering wheel W is connected to a steering shaft SS (see FIG. 2) of the vehicle by fixing with a nut N. The vertical direction corresponds to a vertical direction along the axial direction of the steering shaft SS. The right-left direction corresponds to a right-left direction of the vehicle which is a direction orthogonal to the axis of the steering shaft SS. The front-rear direction corresponds to a front-rear direction of the vehicle which is the axis orthogonal direction of the steering shaft SS (see FIGS. 1 and 2).

In the case of the embodiment, the spoke portion S of the steering wheel W is configured of three portions of a left spoke portion SL and a right spoke portion SR in the right-left direction, and a rear spoke portion SB on the rear side. In the front side of the boss portion B between the left and right spoke portions SL and SR in the steering wheel W, a large gap H to secure a visibility of a meter on the front side of a driver seat and the like is formed between the boss portion B and the ring portion R.

The steering wheel body 1 includes a cored bar 2 disposed to connect the ring portion R, the boss portion B, and the spoke portion S to each other, and a coating layer 7 which is made of urethane and the like and covers the ring portion R and the cored bar 2 of the spoke portion S near the ring portion R. Leather 8 is wound on the surface of the coating layer 7. Decorative garnishes 13 and 15 are disposed on the inner circumferential side of the front portion and the rear portion of the ring portion R.

The cored bar 2 includes a ring cored bar 3 disposed in the ring portion R, a boss cored bar 4 disposed in the boss portion B so as to be connected with the steering shaft SS, and a spoke cored bar 5 disposed to the right and left spoke portions S (SL and SR) so as to connect the ring cored bar 3 and the boss cored bar 4. In the case of the embodiment, the spoke cored bars 5 are disposed only in the two right and left spoke portions SL and SR on the front side. A bezel 14 covering the vicinity of an airbag cover (to be described, pad) 35 is disposed in the spoke portion SB on the rear side.

A fixing portion 10 which fixes each assembly pin 27 of a horn switch mechanism 25 (to be described) of the airbag device 20 is disposed in the circumferential edge of the boss cored bar 4 of the cored bar 2 (see FIG. 2). The fixing portion 10 is a fixing portion of mounting the airbag device 20 in the steering wheel W. The fixing portion 10 includes a locking hole 11 which is penetrated in a tapered shape narrowed downward, and a locking pin 12 which is disposed on the lower surface of the boss cored bar 4 and locks the tip (lower end) of the assembly pin 27. The locking pin 12 is formed of a bendable spring to be restorable and along the lower surface of the boss cored bar 4.

The steering wheel body 1 is configured such that a lower cover 16 is disposed on the lower surface of the boss portion B (see FIGS. 2 and 3).

As illustrated in FIGS. 1 to 3, the airbag device 20 includes an approximately columnar folded body 70 obtained by folding the airbag 50, an inflator 30 which supplies an inflation gas to the airbag 50, the airbag cover (pad) 35 which is made of synthetic resin, and is disposed on the upper surface of the boss portion B to cover the folded body 70, and the airbag holder 21 which is made of metal and holds the folded body 70 (airbag 50) for mounting in the boss portion B of the steering wheel W. The airbag holder 21 is a portion which fixedly attaches the folded body 70, and holds the inflator 30 and the airbag cover 35.

In the case of the embodiment, in the folded body 70 obtained by folding the airbag 50, a quadrangular annular retainer 42 made of metal plate for fixedly attaching the airbag 50 in the airbag holder 21 is disposed inside a bottom surface 70b. (see FIGS. 2, 3 and 5 to 7). The airbag 50 is folded in advance in the state of being assembled with the retainer 42 to be formed into a folding preparation body 64 (see FIG. 8). The folding preparation body 64 is folded to be formed into the folded body 70 (see FIGS. 9 to 12), and the folded body 70 is fixedly attached to the airbag holder 21.

Figure 13:
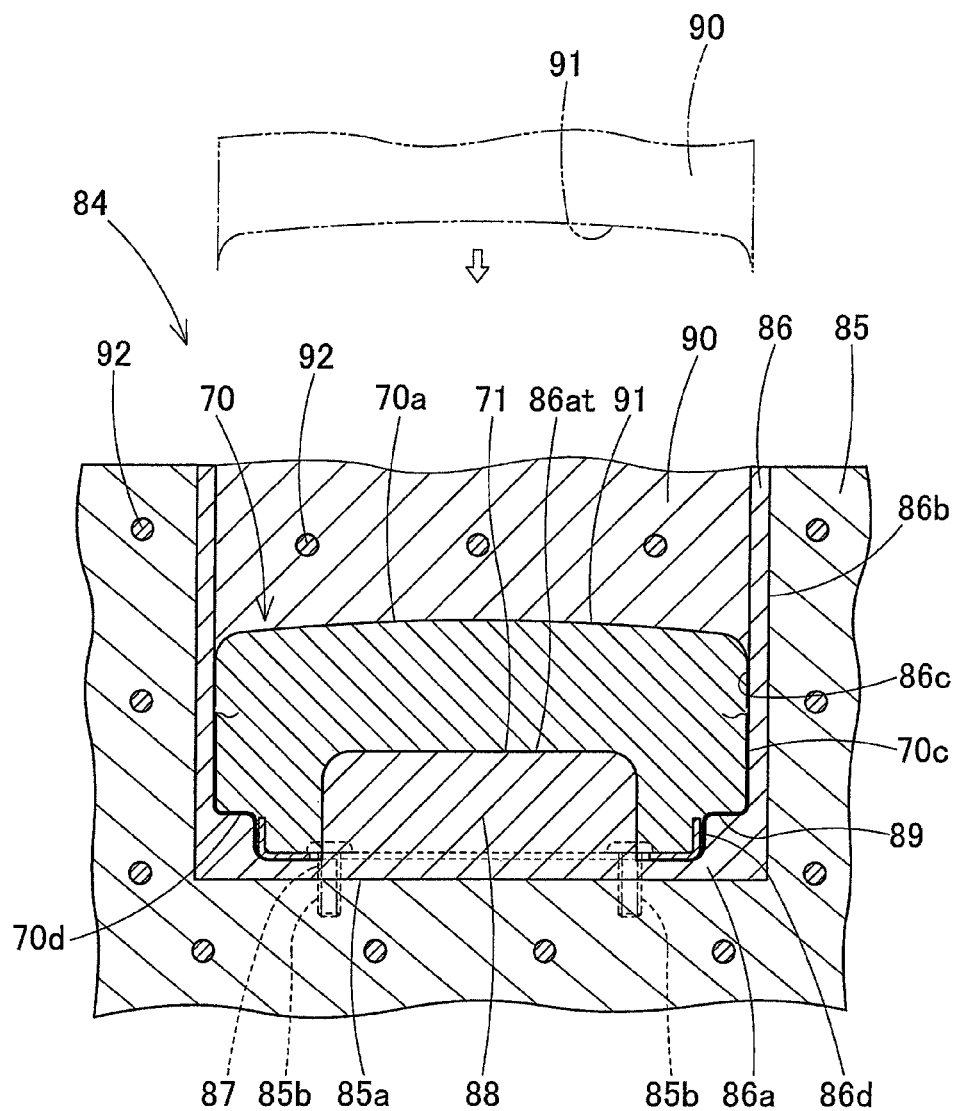
FIG. 13 is a view illustrating a heating compression process for retaining the folded shape of the folded body obtained by folding the folding preparation body of the embodiment.
Figure 14:
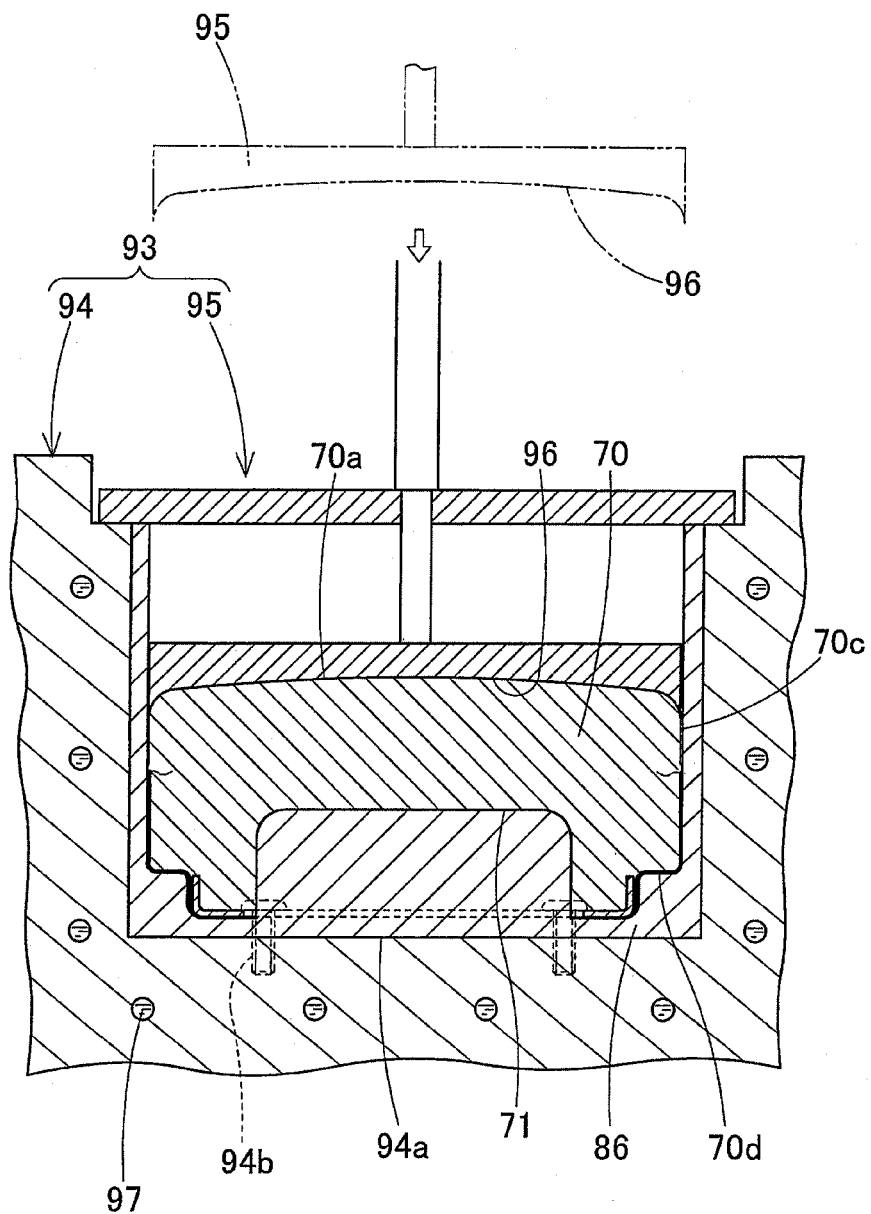
FIG. 14 is a view illustrating a cooling compression process for retaining the folded shape of the folded body obtained by folding the folding preparation body of the embodiment, and illustrates a process after FIG. 13.

In the case of the embodiment, the folded body 70 is further compressed in order that the folded shape can retain for a long time (in other words, in order to secure high shape holding property) from a time when the folding preparation body 64 is folded to be formed into the folded body 70 to a time when the folded body 70 is mounted in the airbag holder 21, and in order to shape a recess portion 70d for preventing a partial jam of the airbag 50 into a gap between the retainer 42 and the airbag holder 21, and a storage recess portion 71 for storing the inflator 30 (see FIGS. 13 and 14).

As illustrated in FIGS. 2 and 3, the inflator 30 includes a columnar main body portion 31, and a quadrangular annular flange portion 32 projects from the outer circumferential surface of the main body portion 31. A through hole 32a through which a bolt 45 (to be described) of the retainer 42 penetrates is formed in the flange portion 32. A plurality of gas discharge outlets 31a discharging an inflation gas are disposed in an upper portion 31b of the main body portion 31 above the flange portion 32.

As illustrated in FIGS. 1 to 3, the airbag cover 35 is made of synthetic resin such as an olefin-based thermoplastic elastomer (TPO), and is disposed on the upper surface of the boss portion B near the center of the steering wheel W. The airbag cover 35 includes a ceiling wall portion 36 which covers the upper side of the folded body 70 stored inside the boss portion B in the state of being folded, and a side wall portion 39 which extends in an approximately cylindrical shape from the lower surface of the ceiling wall portion 36, and covers the side surface (outer circumferential surface) 70c of the approximately columnar folded body 70.

A disc-shaped door portion 36a which is openable forward by being pressed by the inflating airbag 50 is disposed in the ceiling wall portion 36. The door portion 36a is provided with a hinge portion 36b on the front edge side, and a thin rupture expected portion 36c which has an approximately arc shape in top view is provided therearound.

In the case of the embodiment, a synthetic-resin ornament 38 with an approximately disc shape is firmly fixed on the upper surface of the door portion 36a. When the door portion 36a is opened, the ornament 38 rotates integrally with the door portion 36a.

As illustrated in FIGS. 1 to 3, locking leg portions 40 coupled with the airbag holder 21 are disposed at three places which are a portion on the front side and obliquely rear portions on the right and left sides of the side wall portion 39 of the airbag cover 35. Each locking leg portion 40 projects to extend downward from a lower end surface 39c of the side wall portion 39, and is inserted into a locking hole 22e of the airbag holder 21 to be locked to the circumferential edge of the locking hole 22e. The locking leg portion 40 includes an inner protrusion 40a protruding from an inner circumferential surface 39a of the side wall portion 39 and an outer protrusion 40b protruding from an outer circumferential surface 39b of the side wall portion 39. After the locking leg portion 40 is inserted into the locking hole 22e, the inner protrusion 40a is locked by a tongue portion 22f deformed by bending, and the locking leg portion 40 is pressed by the tongue portion 22f. The outer protrusion 40b is locked by the circumferential edge of the outer edge side, which is separated from the inflator 30, of the locking hole 22e, whereby the airbag cover 35 is regulated not to come out upward so as to be locked in the airbag holder 21.

The side wall portion 39 is configured such that the lower end surface 39c between the locking leg portions 40 and 40 abuts on a base plate portion 22 of the airbag holder 21, and the locking leg portion 40 regulates the upward movement of the airbag holder 21. Therefore, the airbag cover 35 is fixedly attached to the airbag holder 21 so as to regulate the vertical movement and the front-rear and right-left movements of the airbag holder 21.

The airbag holder 21 is made of metal plate. As illustrated in FIGS. 1 to 3, the airbag holder 21 holds the folded body 70, the inflator 30, and the airbag cover 35. The airbag holder 21 is configured as a metal plate member which attaches the airbag device 20 to the steering wheel body 1 by using a switch body 26. The airbag holder 21 includes the approximately annular base plate portion 22, and a side wall support portion 23 protruding upward from the outer circumferential edge of the base plate portion 22.

Locking portions 22d formed by penetrating the locking hole 22e provided with the tongue portion 22f are disposed in a portion on the front side and in obliquely rear portions on the right and left sides of the base plate portion 22. Approximately semi disc-shaped switch support portions 22g which fix each switch body 26 are disposed on the rear side and both the right and left sides. The side wall support portion 23 is disposed in the outer circumferential surface 39b of the side wall portion 39 of the airbag cover 35 between the locking portion 22d and the switch support portion 22g. The side wall support portion 23 regulates the deformation of inflating the side wall portion 39 at the time of inflation of the airbag 50.

An approximately circular insertion hole 22a through which the main body portion 31 of the inflator 30 is insertable from below and which corresponds to an inflow opening 53 of the airbag 50 is open in the center of the base plate portion 22. The four through holes 22b through which the bolts 45 of the retainer 42 penetrate are formed in the circumferential edge of the insertion hole 22a. The portion, where the through hole 22b is provided in the circumferential edge of the insertion hole 22a, serves as an attachment seat 22c for attaching the folded body 70 and the inflator 30 by using the retainer 42.

Three switch bodies 26 disposed in the switch support portions 22g form the floating-type horn switch mechanism (horn switch) 25 of the steering wheel W. As illustrated in FIG. 2, each of the switch bodies 26 is biased upward by a coil spring 28. A position biased upward from the fixing portion 10 of the cored bar 2 is regulated by the assembly pin 27 which is locked to regulate the pulling-out. At the time of operating the horn switch mechanism (horn switch) 25, when the airbag device 20 is pressed downward, a moving-side contact in the switch body 26 on the switch support portion 22g side approaches a fixing-side contact on the assembly pin 27 side, and thus electric current is passed through a horn operating circuit to operate a horn.

Specifically, when the vicinity of the center of the ceiling wall portion 36 of the airbag cover 35 is operated to be pressed down, the ceiling wall portion 36 abuts on the ceiling surface 70a of the folded body 70 having such shape holding property that can support the ceiling wall portion 36 to press down the folded body 70, and thus causes a falling movement of the airbag holder 21 on which the bottom surface 70b of the folded body 70 moving downward abuts. For this reason, the airbag holder 21 together with the base plate portion 22 allows the moving-side contact of each switch body 26 to descend so that the horn is operated.

Figure 4:
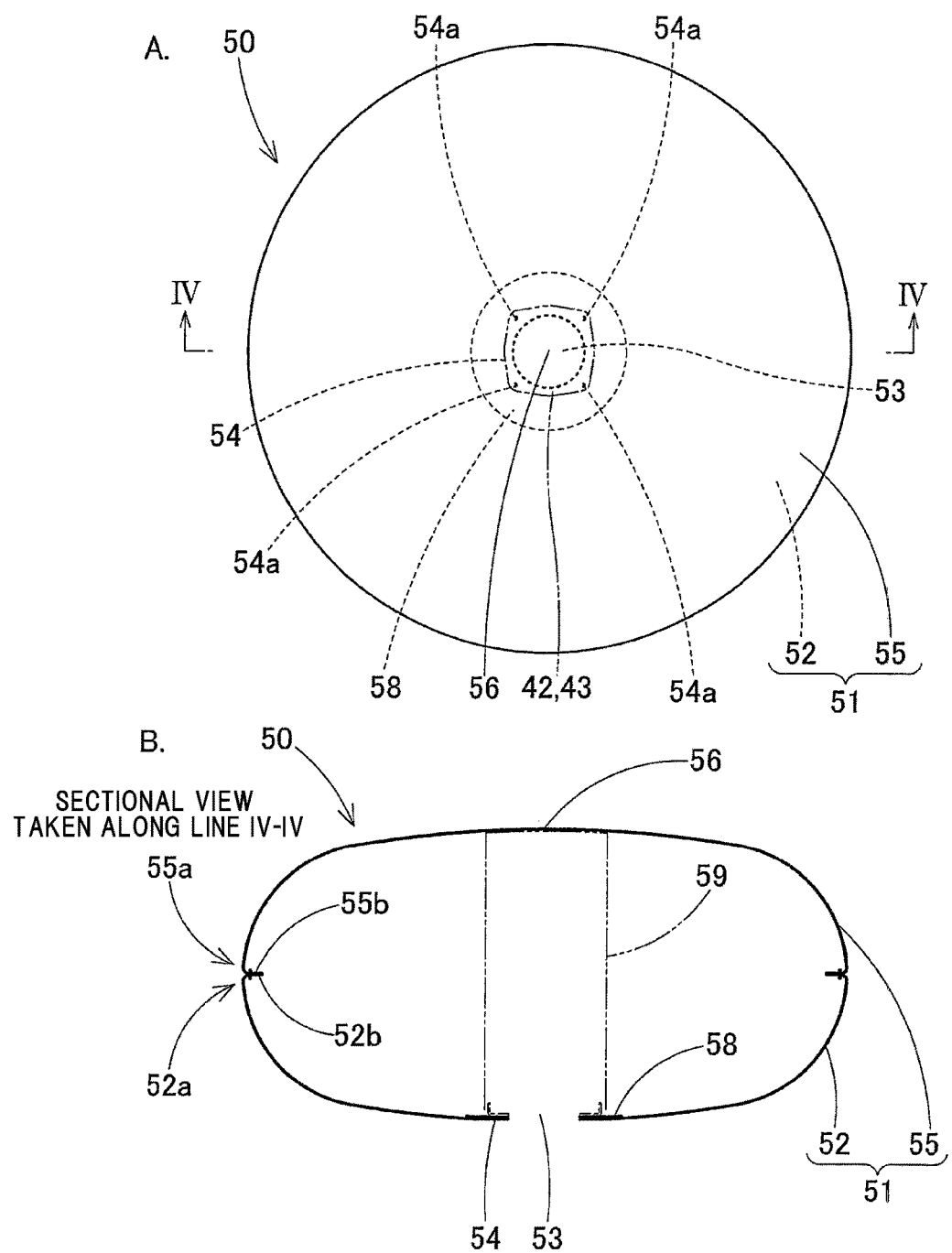
FIG. 4 is a plan view and a sectional view schematically illustrating a state where inflation of the airbag of the embodiment in single piece is completed.
Figure 16:
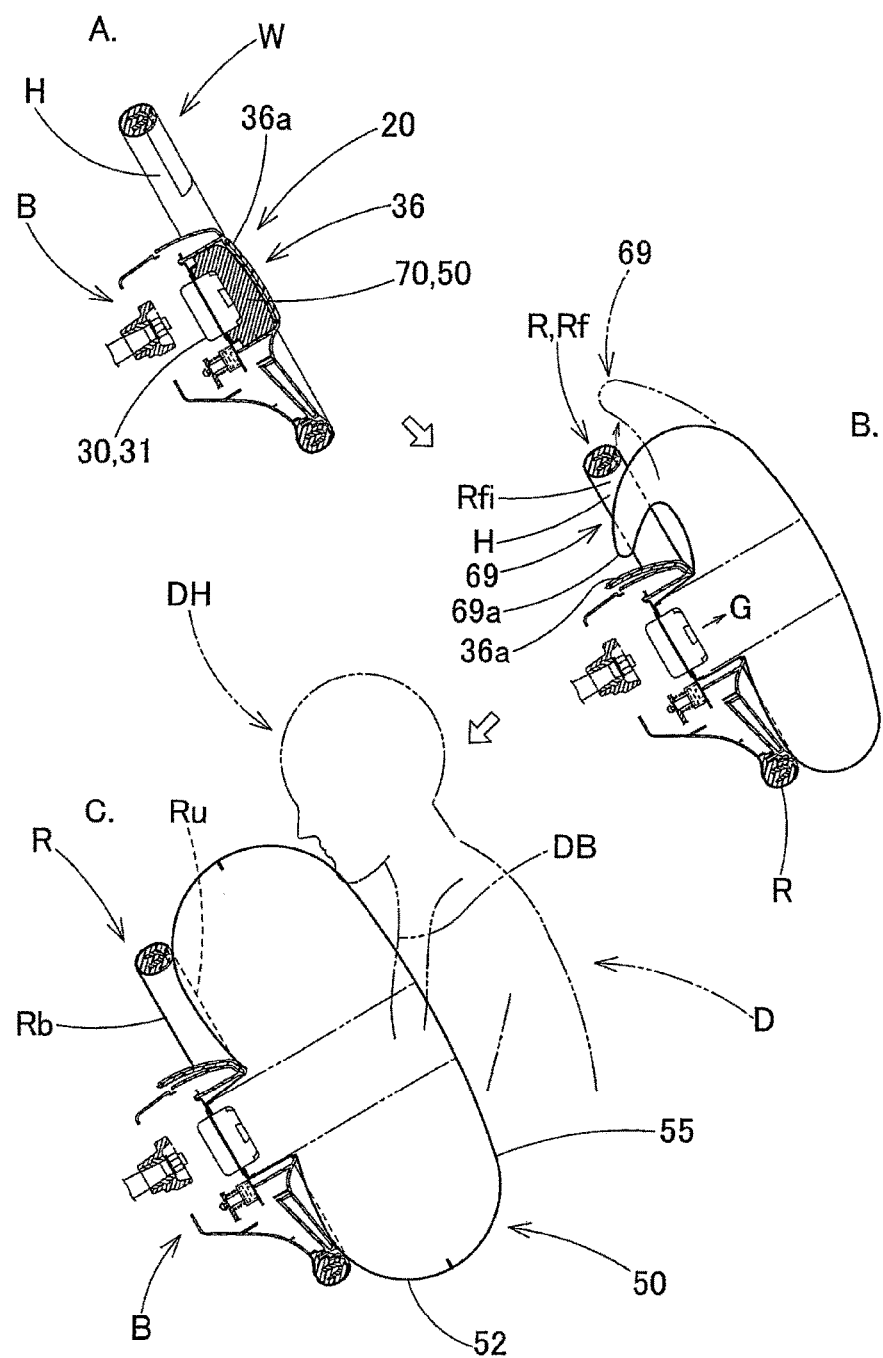
FIG. 16 is a perspective longitudinal sectional view sequentially illustrating the operation of the airbag device using the airbag of the embodiment in a case where the driver is not close to the steering wheel.

As illustrated in the two-dot chain lines of FIGS. 1 and 2 and in Section C of FIG. 16, the airbag 50 has a completely-inflated shape which is an approximately-disc shape having the same thickness close to a spherical shape and includes the inflow opening 53 which is circularly open to allow the inflation gas to flow downward (see FIG. 4). The circumferential edge of the inflow opening 53 serves as an attachment portion 54 for the attachment of the airbag holder 21. Four through holes 54a through which bolts 45 of the retainer 42 penetrate are formed in the attachment portion 54.

An outer circumferential wall 51 of the airbag 50 includes a vehicle body side wall 52 having the above-described inflow opening 53 and the attachment portion 54 disposed near the center thereof, and a driver side wall 55 which is disposed to face the vehicle body side wall 52 by connecting the outer circumferential edge 55a to the outer circumferential edge 52a of the vehicle body side wall 52. The vehicle body side wall 52 and the driver side wall 55 are formed of base fabric for airbags which has a circular outer shape and is made of synthetic fiber such as polyamide and polyester having bendability. The outer circumferential wall 51 is formed by sewing sewing margins 52b and 55b provided in the outer circumferential edges 52a and 55a to each other.

The inner surface of the attachment portion 54 of the vehicle body side wall 52 is allowed to abut on the lower surface of a bottom wall portion (to be described) 43 of the retainer 42, and thus the attachment portion 54 becomes substantially quadrangular annular portion fixed in an attachment seat 22c of the airbag holder 21.

As illustrated in FIGS. 1 to 3 and 5 to 7, the retainer 42 includes the quadrangular annular bottom wall portion 43 having a communication opening 44 open in correspondence to the inflow opening 53 in the center thereof, and a reinforcing rib 46 which is disposed to stand from the entire outer circumferential edge of the bottom wall portion 43, and is formed of sheet metal. The communication opening 44 has the same circular opening as the inflow opening 53. The retainer 42 protrudes downward from the bottom wall portion 43, which is centered on the communication opening 44, near the communication opening 44. The retainer 42 includes the bolts 45 as a plurality of fixing means for fixing the attachment portion 54 of the airbag 50 to the airbag holder 21. Each bolt 45 projects downward from the vicinities of four corners of the quadrangular annular bottom wall portion 43. The retainer 42 is disposed in the attachment portion 54 of the inflow opening 53 in the airbag 50. The bolts 45 penetrate through the through hole 54a of the airbag 50, the through hole 22b of the airbag holder 21, and the through hole 32a of the flange portion 32 of the inflator 30 in order, and the nut 48 is fastened to the bolt 45, whereby the airbag 50 and the inflator 30 are attached to the airbag holder 21.

In order to improve the thermal resistance of the attachment portion 54, the annular reinforced fabric 58 is sewed in the attachment portion 54 of the airbag 50. A tether 59 extends from the outer circumferential edge of the reinforced fabric 58 to connect the attachment portion 54 and a central portion 56 of the driver side wall 55 and is disposed in the attachment portion 54 to regulate a separation distance of the vicinity of the central portion 56 of the airbag 50 from the attachment portion 54. For this reason, in actual, the retainer 42 abuts on the attachment portion 54 of the vehicle body side wall 52 with the reinforced fabric 58 interposed therebetween.

A manufacturing process of assembling the airbag 50 assembled with the retainer 42 in the airbag holder 21 includes a folding process and a compression process for securing strong retention property (high shape holding property) of the folded shape of the folded body 70 and for forming the recess portions 70d and 71.

Figure 8:
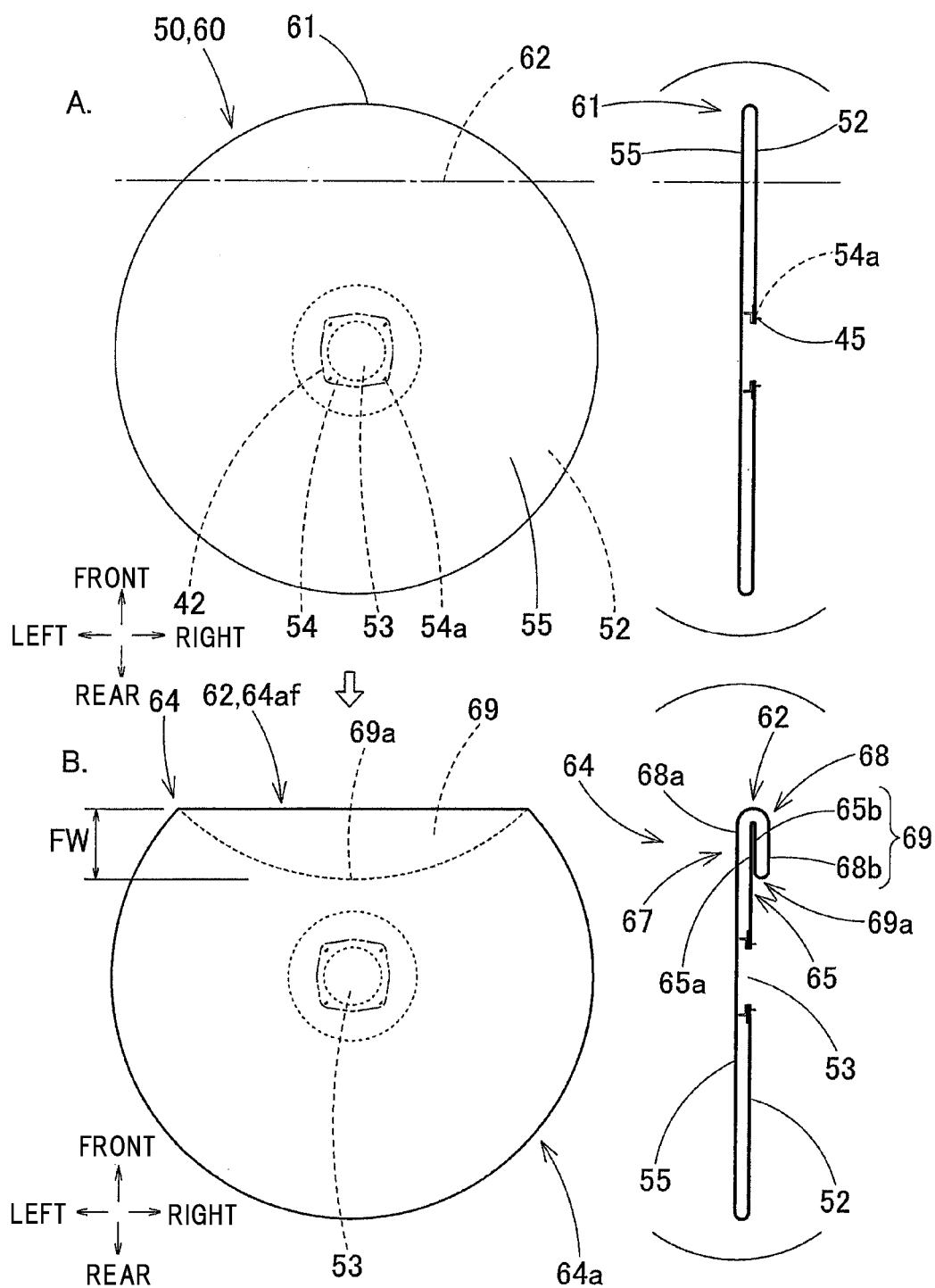
FIG. 8 is a view for describing the state of forming the folding preparation body of the embodiment.

Describing the folding process, as illustrated in Section A of FIG. 8, each bolt 45 protrudes from the through hole 54a, and the retainer 42 is disposed in the attachment portion 54 in the airbag 50. The driver side wall 55 is overlapped on the vehicle body side wall 52 to form an initial preparation body (also referred to as an initial deployed body) 60 obtained by deploying the airbag 50 flatly.

As illustrated in Section B of FIG. 8, the folding preparation body 64 is formed. That is, a pre-folded portion 69 is formed in the front edge 61 of the initial preparation body 60 to form the folding preparation body 64. The pre-folded portion 69 can be formed by providing only one crease 62 in the front edge 61 of the initial preparation body 60 in a right and left direction and folding the front edge 61 to approach the inflow opening 53 in the vehicle body side wall 52.

The folding preparation body 64 is configured such that the vehicle body side wall 52 is provided with a planar non-folded portion 65a from the inflow opening 53 to the crease 62 of the pre-folded portion 69, and a planar folded portion 65b which is folded from the crease 62 to be overlapped on the lower surface of the non-folded portion 65a in a front side portion 65 of the inflow opening 53. The driver side wall 55 is configured such that a cover portion 68 which has a J-shape in sectional view and covers the outer surfaces of the non-folded portion 65a and the folded portion 65b is formed in a front side portion 67.

The pre-folded portion 69 includes the folded portion 65b of the vehicle body side wall 52 and a lower surface side portion 68b which covers the outer surface of the folded portion 65b in the cover portion 68 of the driver side wall 55. The folded portion 65b of the vehicle body side wall 52 and the lower surface side portion 68b of the driver side wall 55 in the pre-folded portion 69 have an arcuate shape together by using the linear crease 62 extending in the right and left direction as a string in plan view of the initial preparation body 60.

Figure 9:
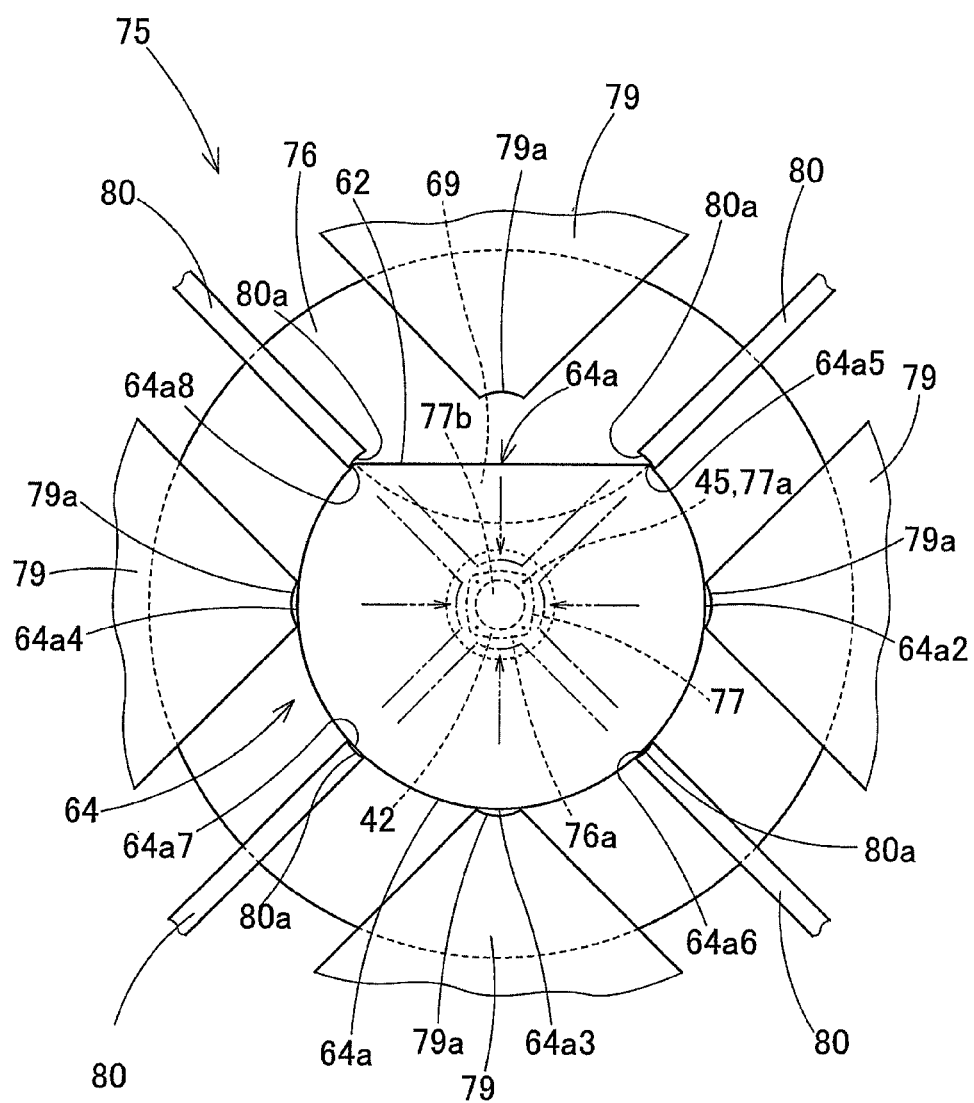
FIG. 9 is a perspective plan view for describing an airbag folding machine which forms the folded body obtained by folding the folding preparation body of the embodiment.
Figure 10:
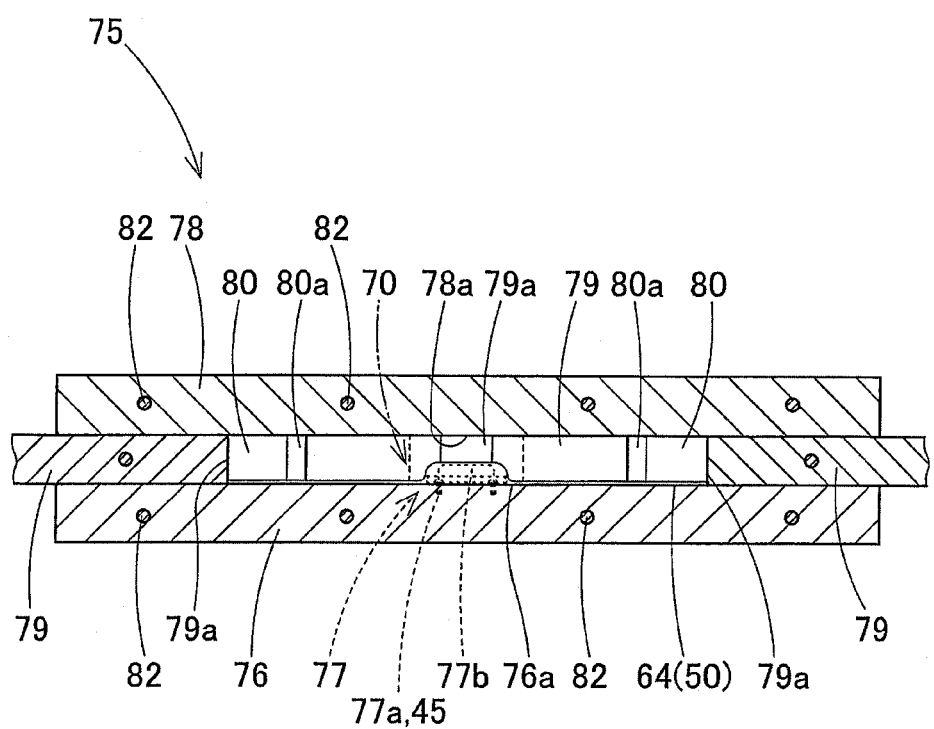
FIG. 10 is a perspective sectional view illustrating the airbag folding machine which folds the folding preparation body of the embodiment.
Figure 11:
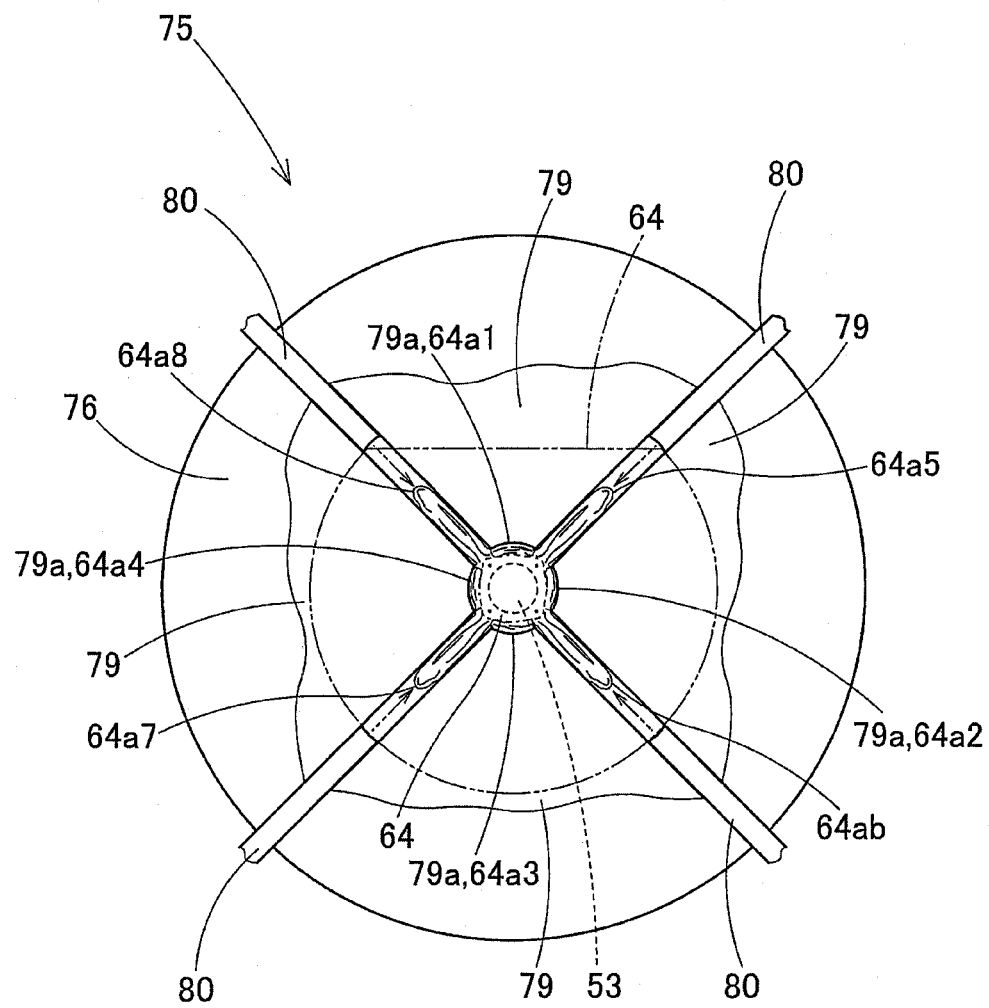
FIG. 11 is a view illustrating a folding process of the folding preparation body of the embodiment.
Figure 12:
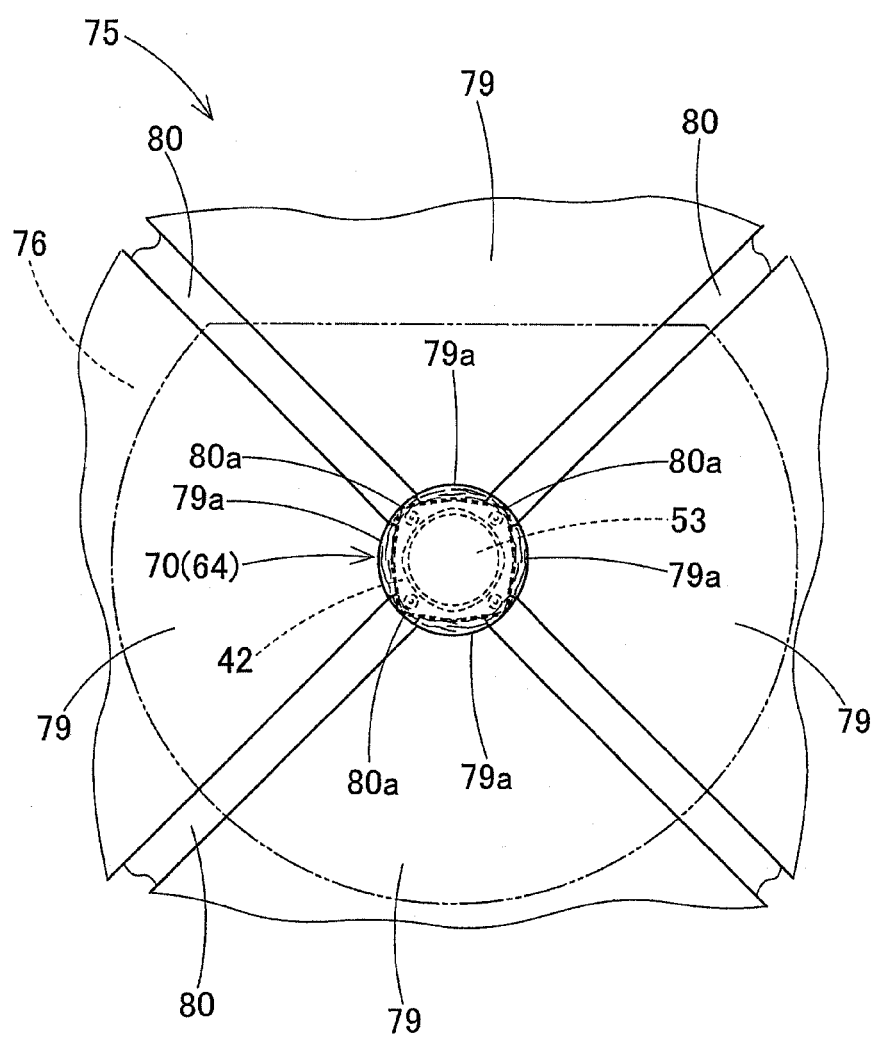
FIG. 12 is a view illustrating a folding process of the folding preparation body of the embodiment, and illustrates a process after FIG. 11.

The folding preparation body 64 thus formed is set in an airbag folding machine 75 illustrated in FIGS. 9 and 10 to form the folded body 70, and is folded to be gatherd to the upper side of the inflow opening 53 as illustrated in FIGS. 9, 11, and 12.

As illustrated in FIGS. 9 to 12, the airbag folding machine 75 includes a substrate 76, a ceiling wall portion 78 disposed to be movable vertically above the substrate 76, and two kinds of four pressing tools 79 and four pressing tools 80 which move to the central side of the substrate 76 on the substrate 76. A set portion 77 having an assembly hole 77a for fitting each bolt 45 of the retainer 42 protruding from the folding preparation body 64 is disposed in the center of the upper surface of the substrate 76. The set portion 77 on the upper surface side of the substrate 76 serves as a molding surface (mold surface) 76a which forms the bottom surface 70b before the recess portion 70d or the storage recess portion 71 (to be described) of the folded body 70 of the airbag 50 is provided. The vicinity of the center of the lower surface of the ceiling wall portion 78 serves as the molding surface (mold surface) 78a which forms the ceiling surface 70a before the recess portions 70d and 71 of the folded body 70 are provided. A substantially columnar convex 77b is disposed in the set portion 77 so that the storage recess portion 71 for storing the upper portion of the inflator 30 is easily formed in the folded body 70. The set portion 77 is configured to be able to hold the bolt 45 of the retainer 42 reliably so that a portion except the attachment portion 54 of the airbag 50 cannot enter the lower surface of the bottom wall portion 43 of the retainer 42 at the time of the folding process.

The pressing tools 79 and 80 are alternately disposed in a circumferential direction centered on the set portion 77. Arc-shaped molding surfaces (pressing surface, mold surface) 79a and 80a, which form the outer circumferential surface 70c before the recess portions 70d and 71 of the folded body 70 are provided, are formed on the surface of the set portion 77.

A heater 82 as a heating means is disposed in the substrate 76 and the ceiling wall portion 78 such that the temperature of the set folding preparation body 64 can rise to 50° C. or more (about 50 to 90° C.). The heater 82 is properly disposed also in the pressing tools 79 and 80.

In the folding process in which the airbag folding machine 75 is used, first, as illustrated in FIG. 9, each bolt 45 is fitted into the assembly hole 77a of the set portion 77 in a state where the folding preparation body 64 is formed. In addition, although the folding preparation body 64 is not formed in advance, the folding preparation body 64 may be formed in such a manner that each bolt 45 protruding from the inside of the airbag 50 is fitted into the assembly hole 77a of the set portion 77, the driver side wall 55 is overlapped on the vehicle body side wall 52, the initial preparation body 60 of the airbag 50 is formed on the substrate 76, and the pre-folded portion 69 is formed.

The ceiling wall portion 78 is disposed at a position of a predetermined height from the substrate 76 to form the folded body 70 (see FIG. 10).

As illustrated in FIG. 11, each pressing tool 79 is moved to the set portion 77 side so that a plurality of places (four places) 64a1, 64a2, 64a3, and 64a4, which are evenly disposed in a radial shape about the inflow opening 53, in the outer circumferential edge 64a of the folding preparation body 64 are gathered to the upper side of the inflow opening 53. As illustrated in FIG. 12, each pressing tool 80 is moved to the set portion 77 side so that a plurality of places (four places: places disposed at positions evenly deviated in a radial shape from the pressing tool 79) 64a5, 64a6, 64a7, and 64a8 which are evenly disposed in a radial shape about the inflow opening 53, in the outer circumferential edge 64a of the folding preparation body 64 are gathered to the upper side of the inflow opening 53.

By the molding surface 76a on the upper side of the vicinity of the set portion 77 of the substrate 76, the molding surface 78a in the vicinity of the center of the lower surface of the ceiling wall portion 78, and the respective molding surfaces 79a and 80a of the pressing tools 79 and 80, the folding preparation body 64 is folded to the substantially columnar folded body 70 before the storage recess portion 71 or the recess portion 70d is provided.

In the compression process (heating compression process and cooling compression process) of compressing the folded body 70 passed through the folding process, airbag molding machines 84 and 93 are used (see FIGS. 13 and 14).

As illustrated in FIG. 13, the airbag molding machine 84 forms the storage recess portion 71 and the recess portion 70d by heat-compressing the folded body 70. The airbag molding machines 84 is also called an airbag heat-compressing machine or molding die (heat-compressing molding die). In the case of the embodiment, a holding frame portion 86 which is made of metal such as steel excellent in thermal conductivity is used. The airbag heat-compressing machine (airbag molding machine 84) includes a molding body portion 85 having a set portion 85a storing the holding frame portion 86, and a pressing-side portion 90 which is vertically movable.

The holding frame portion 86 is provided with the cylindrical-shaped side wall portion 86b above the outer circumferential edge of a substantially circular bottom wall portion 86a. A storage recess portion 86d into which the folded body 70 assembled with the retainer 42 is fitted is provided inside the holding frame portion 86. The assembly hole 87 through which each bolt 45 of the retainer 42 penetrates is provided in the bottom wall portion 86a. A storage convex portion 88 which can form the storage recess portion 71 and protrudes in a substantially columnar shape is disposed in the center of the bottom wall portion 86a. A substantially annular convex 89 for forming the recess portion 70d is disposed in the outer circumferential edge of the bottom wall portion 86a. The upper surface of the bottom wall portion 86a serves as a molding surface 86at which shapes the bottom surface 70b of the folded body 70. The inner circumferential surface of the side wall portion 86b serves as a molding surface 86c which forms the outer circumferential surface 70c of the folded body 70.

The assembly hole 85b which can store each bolt 45 of the retainer 42 is formed in the set portion 85a which stores the holding frame portion 86 of the molding body portion 85.

A pressing surface (molding surface) 91 which forms the curved ceiling surface 70a of the folded body 70 is disposed on the lower surface of the pressing-side portion 90.

The heaters 92 as a heating means are disposed in the molding body portion 85 and the pressing-side portion 90 such that the temperature of the folded body 70, which is set in the state where the temperature is raised in the folding process, similarly to the holding frame portion 86 can rise to 100° C. or more (about 100 to 150° C.).

The pressing force of the pressing-side portion 90 is set in a range of about 80 to 250 N/cm$^2$ such that the folded body 70 has a durability to maintain such a folded shape that can be stored in the compact storage space on the airbag holder 21.

In the heating compression process in which the airbag molding machine 84 is used, first, in a state where the pressing-side portion 90 is disposed away upwardly from the holding frame portion 86, the folded body 70 is disposed on the bottom wall portion 86a so that each bolt 45 protrudes from the assembly hole 87. The folded body 70 is stored in the holding frame portion 86, and the holding frame portion 86 is set to the set portion 85a of the molding body portion 85. As illustrated in FIG. 13, the pressing-side portion 90 is inserted into the set holding frame portion 86, the folded body 70 is compressed and heated, and the compressed and heated state maintains for about 1 to 2 hours.

When the predetermined time elapses, the folded body 70 having the shaped recess portions 70d and 71 is formed inside the holding frame portion 86.

As illustrated in FIG. 14, the airbag molding machine (airbag cool-compressing machine or molding die (cool-compressing molding die)) 93 used in the cooling compression process includes a molding body portion 94 having a set portion 94a storing the holding frame portion 86 and the pressing-side portion 95 which is movable vertically. The assembly hole 94b which can store each bolt 45 of the retainer 42 is formed in the set portion 94a which stores the holding frame portion 86 of the molding body portion 94. A pressing surface (molding surface) 96 which forms the curved ceiling surface 70a of the folded body 70 is disposed on the lower surface of the pressing-side portion 95.

A cooling water passage 97 as a cooling means is disposed in the molding body portion 94 such that the temperature of the set folded body 70 similarly to the holding frame portion 86 can be cooled to 40° C. or less (about 5 to 40° C.).

The pressing force of the pressing-side portion 95 is set in a range of about 30 to 120 N/cm$^2$ such that the folded shape can be stored in the storage space on the airbag holder 21. In the heating compression process before the cooling compression process, the folded body 70 is shaped to the substantially predetermined folded shape. The pressing force of the pressing-side portion 95 may be smaller than the pressing force of the pressing-side portion 90 in the heating compression process.

In the cooling compression process in which an airbag cool-compressing machine 93 is used, the holding frame portion 86 which have stored the folded body 70 extracted from the airbag heat-compressing machine 84 is set to the set portion 94a of the molding body portion 94 in a state where the pressing-side portion 95 is lifted up. The pressing-side portion 95 is inserted into the set holding frame portion 86, the folded body 70 is compressed and cooled, and the compressed and cooled state maintains for about 20 to 50 minutes.

Figure 5:
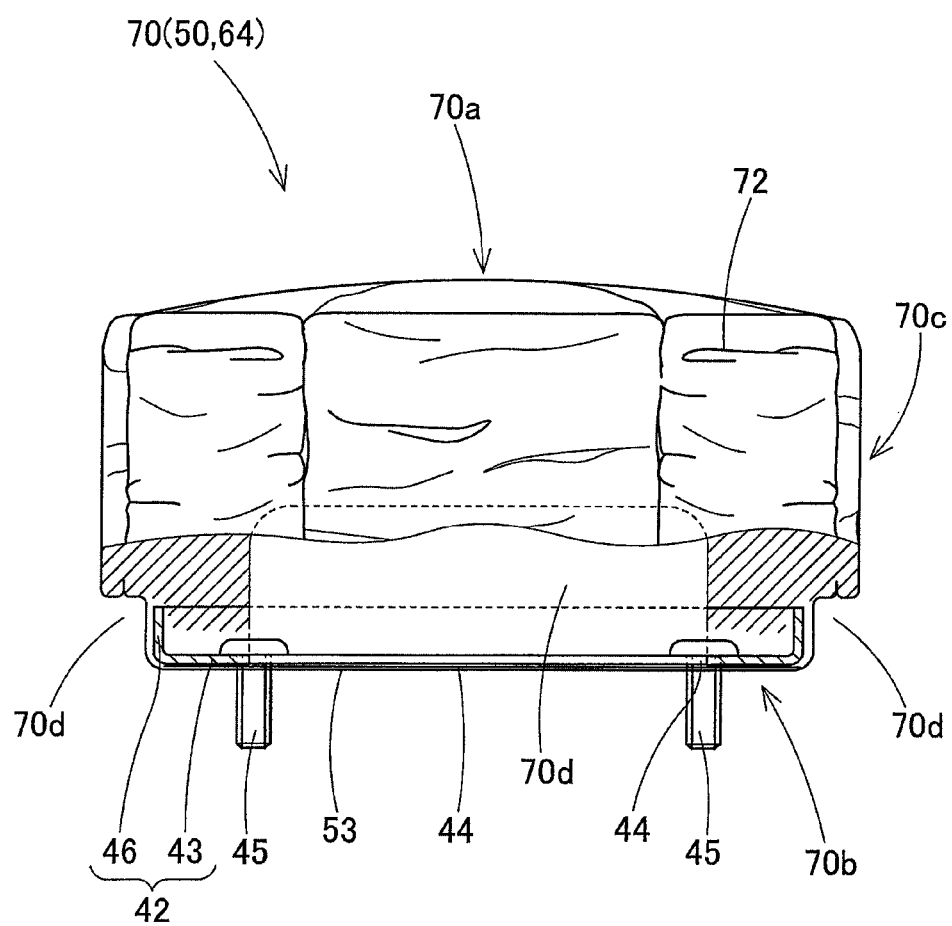
FIG. 5 is a partially sectional view schematically illustrating the folded body in a state where a retainer of the embodiment is assembled.
Figure 6:
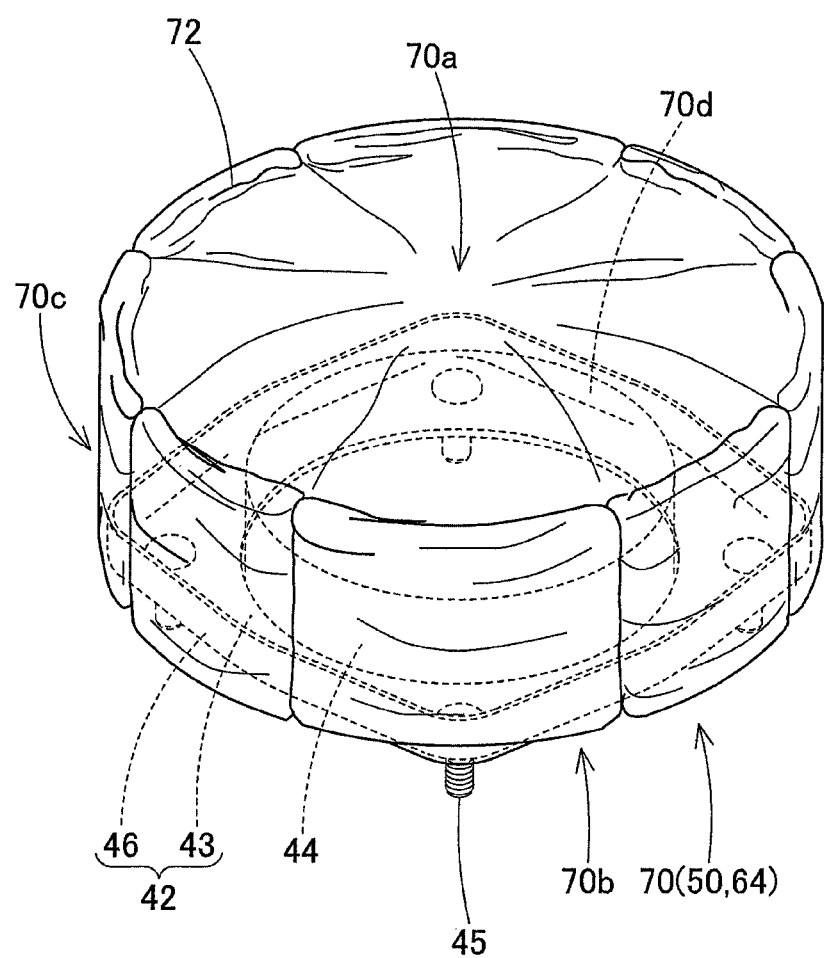
FIG. 6 is a perspective view schematically illustrating the folded body in a state where the retainer of the embodiment is assembled.
Figure 7:
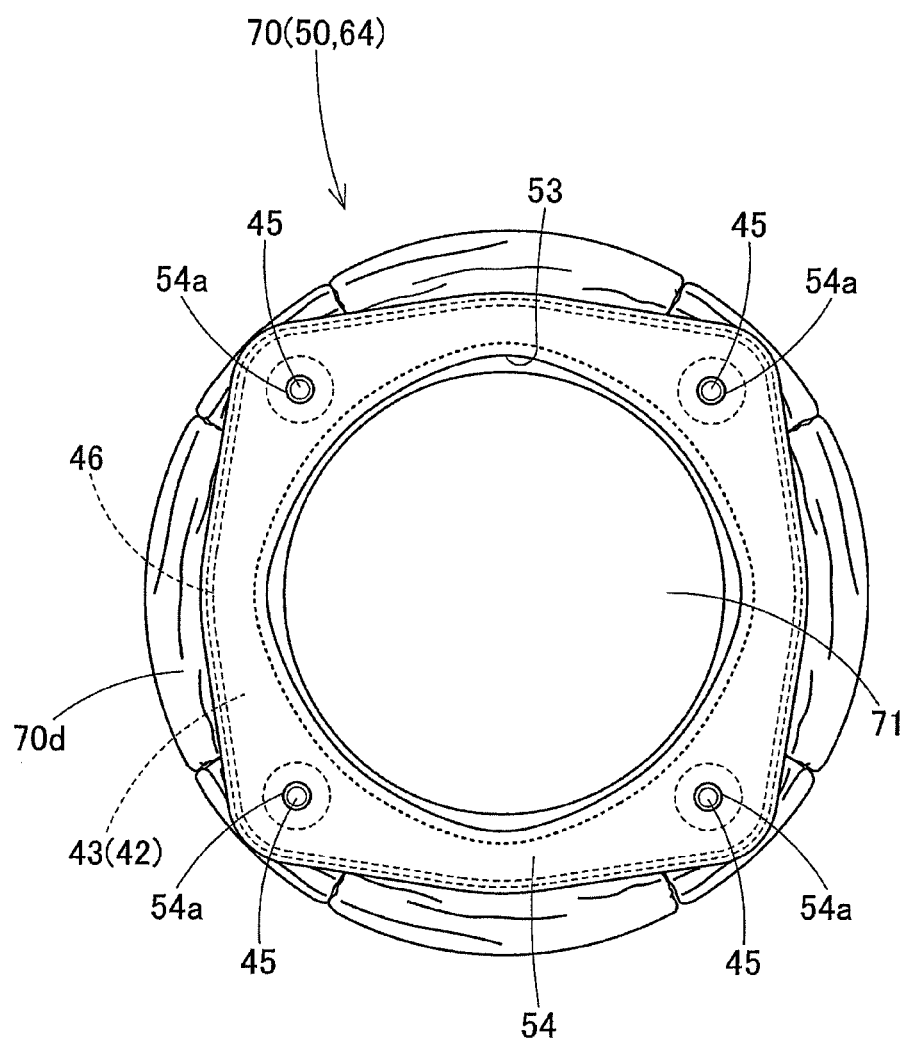
FIG. 7 is a bottom view schematically illustrating the folded body in a state where the retainer of the embodiment is assembled.

When the predetermined time elapses, the folded body 70 shaped in the predetermined folded shape by being assembled with the retainer 42, that is, the folded body 70 which has durability to maintain the folded shape and has the shaped storage recess portion 71 on the central side and the shaped recess portion 70d on the outer circumferential edge in the bottom surface 70b as illustrated in FIGS. 5 to 7 is manufactured in the holding frame portion 86.

The folded body 70 manufactured in this manner has such a shape retention property that can support the ceiling wall portion 36 of the airbag cover 35. Specifically, the folded body 70 has a lower rigidity than the airbag holder 21 and the retainer 42 which are made of a metal plate. However, the folded body 70 has the shape retention property with a higher rigidity than the airbag cover 35, and has such a rigidity that folding collapse does not occur and recess almost does not occur to retain an approximately columnar outer shape although the folded body is inclined obliquely, inverted vertically, or pressed partially. Naturally, the folded body 70 has a shape retention property within a range for allowing deployment of the airbag 50 at the time of inflow of the inflation gas.

As illustrated in FIGS. 5 to 7, the folded body 70 has a substantially columnar shape provided with the storage recess portion 71 on the bottom surface 70b side. The folded body 70 includes the substantially circular ceiling surface 70a which is slightly inflated upward. The storage recess portion 71 extends upward in a cylindrical shape having appropriately the same inner diameter as the communication opening 44 of the retainer 42, and has such a shape that can store the upper portion 31b of the main body portion 31 of the inflator 30.

The recess portion 70d recessed annularly is formed in the outer circumferential edge of the bottom surface 70b of the folded body 70. The recess portion 70d is formed so as to prevent a portion of the outer circumferential wall 51 of the airbag 50 except the attachment portion 54 from being jammed between the airbag holder 21 and the retainer 42.

When the airbag device 20 is assembled, first, the folded body 70 is fitted to the inner circumferential surface 39a of the side wall portion 39 of the airbag cover 35. Each bolt 45 of the folded body 70 penetrates through the through hole 22*b* of the airbag holder 21, each locking leg portion 40 of the airbag cover 35 is inserted into the locking hole 22*e* of the airbag holder 21, each tongue portion 22*f* is bent outside to be locked to the inner protrusion 40*a* of the locking leg portion 40, and the airbag cover 35 is attached to the airbag holder 21 by locking the outer protrusion 40*b* of the locking leg portion 40 to the inner circumferential edge on the outer edge side of the locking hole 22*e*. Each switch body 26 is attached to the airbag holder 21 in advance. Thereafter, each bolt 45 protruding from the airbag holder 21 penetrates through the through hole 32*a* of the inflator 30, and the nut 48 is fastened to the bolt 45 to fixedly attach the folded body 70 and the inflator 30 to the airbag holder 21 assembled with the airbag cover 35, thereby assembling the airbag device 20.

In mounting the airbag device 20 in the vehicle, the lower end of the assembly pin 27 of each switch body 26 is inserted into the locking hole 11 of each fixing portion 10 of the steering wheel body 1 having been assembled to the steering shaft SS, and the assembly pin 27 is locked by the locking pin 12, whereby the airbag device 20 can be attached to the steering wheel body 1. The assembly of the steering wheel W is completed, and the steering wheel W can be mounted in the vehicle together with the airbag device 20.

When the airbag device 20 is attached to the steering wheel body 1, a lead wire (not illustrated) of the airbag holder 21 is connected to the positive electrode of the horn operating circuit, and the lead wire (not illustrated) for inputting an operating signal is connected to the inflator 30.

After mounting in the vehicle, when the operating signal is input to the inflator 30, the inflator 30 discharges an inflation gas G from the gas discharge outlet 31*a*. Accordingly, the folded airbag 50 is inflated by allowing the inflation gas G to flow therein, presses and opens the door portion 36*a* of the ceiling wall portion 36 of the airbag cover 35, protrudes from the opened opening of the door portion 36*a*, and is deployed and inflated to cover an upper surface Ru of the ring portion R from the upper side of the boss portion B (see the two-dot chain lines of FIGS. 1 and 2 and FIG. 16).

As described above, in the folding preparation body 64 of the embodiment, as illustrated in FIG. 8, the pre-folded portion 69 includes the folded portion 65*b* of the vehicle body side wall 52 obtained by folding the front edge 61 of the initial preparation body 60 to approach the inflow opening 53 in the vehicle body side wall 52, and the lower surface side portion 68*b* which covers the outer surface of the folded portion 65*b* in the cover portion 68 of the driver side wall 55. In other words, the pre-folded portion 69 is formed in such a manner that the front edge 61 of the initial preparation body 60 is folded to approach the inflow opening 53 of the vehicle body side wall 52, and only one crease 62 is provided in the right and left direction.

For this reason, the folding preparation body 64 includes the pre-folded portion 69 on the front edge 64*af* side. However, the pre-folded portion 69 is formed by simply folding once the vehicle body side wall 52 and driver side wall 55 of the initial preparation body 60 in the overlapped state without rolling. The front edge 64*af* of the folding preparation body 64 provided with the pre-folded portion 69 is in a state where each of the driver side wall 55 and the vehicle body side wall 52 is overlapped with each other by two walls, that is, total four walls (an upper surface side portion 68*a*, the lower surface side portion 68*b*, the non-folded portion 65*a*, and the folded portion 65*b*) are simply superimposed in a plane shape, thereby suppressing the increase of a rigidity to the utmost. As a result, although the folding preparation body 64 includes the pre-folded portion 69, the bendability of the folding preparation body 64 can be maintained. When the portion of the folding preparation body 64 near the inflow opening 53 is folded to be gathered to the upper side of the inflow opening 53, the folding can be performed smoothly to easily form the folded body 70 with a compact folded shape (see FIGS. 9, 11, and 12).

On the other hand, the pre-folded portion 69 is formed by being folded to a lower surface 64*b* of the folding preparation body 64 and the folded body 70 folded to be gathered to the upper side of the inflow opening 53 is mounted in the boss portion B of the steering wheel W. Even when the airbag 50 is inflated in a state where a head DH or a breast DB of the driver D is close to the boss portion B as illustrated in Section A of FIG. 15, the pre-folded portion 69 enters the gap H between the boss portion B and the ring portion R on the front side of the boss portion B to be inflated in a lower surface Rb of the ring portion R as illustrated in Section B and Section C of FIG. 15, thereby reducing the pressing force to the driver D being close to the steering wheel W.

In a case where the driver D is not close to the steering wheel W, the pre-folded portion 69 gets over the upper surface Ru of the ring portion R, and the airbag 50 is completely inflated in a predetermined completely-inflated shape, which is an approximately disc shape having the same thickness close to a spherical shape, in the upper surface Ru side of the ring portion R as illustrated in FIG. 16. Thus, the driver D can be protected by securing counterforce in the upper surface Ru of the ring portion R and receiving reliably the head DH or the breast DB of the driver D on the driver side wall 55 side.

Therefore, in the folding method of the folding preparation body 64 and the folded body 70 of the driver seat airbag 50 of the embodiment, the folding can be performed without inhibiting the compactness, and when the driver seat airbag 50 is inflated after mounting in the steering wheel W, the pressing force applied to the driver D being close to the steering wheel W can be reduced.

In the folding method of the folded body 70 of the driver seat airbag 50 of the embodiment (the folding method of the folding preparation body 64 or the manufacturing method of the folded body 70), when the portion of the folding preparation body near the inflow opening 53 is gathered to the upper side of the inflow opening 53, the folding preparation body is pressed and folded such that a plurality of places 64*a*1, 64*a*2, 64*a*3, 64*a*4, 64*a*5, 64*a*6, 64*a*7, and 64*a*8 of the outer circumferential edge 64*a* of the folding preparation body 64 approach the inflow opening 53 as illustrated in FIGS. 9, 11, and 12.

For this reason, when the folding is performed as above, the plurality of places 64*a*1, 64*a*2, 64*a*3, 64*a*4, 64*a*5, 64*a*6, 64*a*7, and 64*a*8 of the outer circumferential edge 64*a* of the folding preparation body 64 approach the inflow opening 53. Thus, the portion of the folding preparation body 64 near the inflow opening 53 is gathered equally to the upper side of the inflow opening 53, and the folding is performed without providing a portion protruding partially upward. Therefore, the compact folded body 70 which is mountable in a mounting portion of a small space can be easily obtained.

In the folding method of the folded body 70 of the embodiment, when the portion of the folding preparation body near the inflow opening 53 is gathered to the upper side of the inflow opening 53, the folding preparation body is pressed and folded such that the portion 64*a*1 of the crease 62 of the folding preparation body 64 approaches the inflow opening 53. That is, the folded body 70 is formed in such a manner that the portion 64a1 of the crease 62 is pressed to the upper side of the inflow opening 53 by the molding surface (pressing surface) 79a of the pressing tool 79 disposed on the front side of the inflow opening 53, and the other portions 64a2, 64a3, 64a4, 64a5, 64a6, 64a7, and 64a8 are pressed to the upper side of the inflow opening 53 by the molding surfaces (pressing surfaces) 79a and 80a of the pressing tools 79 and 80.

When the folding is performed as above, the portion 64a1 itself of the crease 62 approaches the inflow opening 53, and thus the folding preparation body can be folded to be the more compact folded body 70. Of course, the pre-folded portion 69 is not rolled, and is not difficult to be bent, and thus the portion 64a1 itself of the crease 62 can approach smoothly the inflow opening 53.

Particularly, in the case of the embodiment, the portion 64a1 of the crease 62 pressed by the molding surface (pressing surface) 79a of the pressing tool 79 presses the laterally central portion of the crease 62 to the center of the inflow opening 53 in a direction orthogonal to the crease 62. The vicinity of the pre-folded portion 69 can be pressed to be folded while the folding is balanced laterally.

Figure 15:
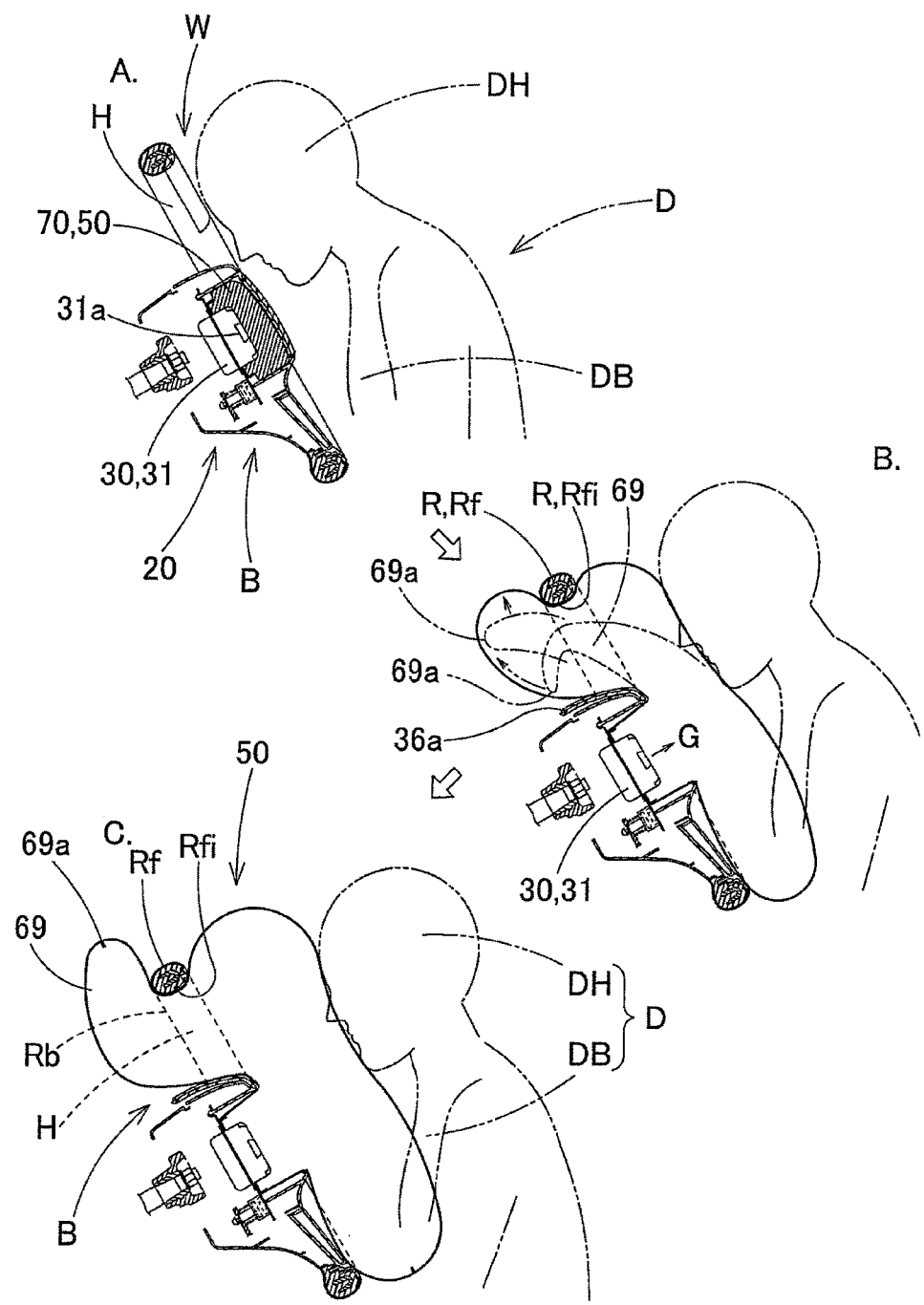
FIG. 15 is a perspective longitudinal sectional view sequentially illustrating the operation of an airbag device using the airbag of the embodiment in a case where the driver is close to the steering wheel.

A folding width FW (see Section B of FIG. 8) of the pre-folded portion 69 of the folding preparation body 64 to the inflow opening 53 is desirably set to such a dimension that when the airbag 50 is inflated in a case where the driver D is close to the steering wheel W, as illustrated in Section B and Section C of FIG. 15, a tip 69a of the pre-folded portion 69 turns in the gap H in an inside Rfi of a front portion Rf of the ring portion R of the steering wheel W to enter the lower surface Rb of the front portion Rf of the ring portion R, whereby the pre-folded portion 69 can be inflated on the lower surface Rb of the front portion Rf of the ring portion R.

The substantially columnar folded body 70 is exemplified in the embodiment. However, the folded body 70 may be folded in a polygonal column shape such as a quadrangular column shape.

In a case where the folded body 70 is formed by folding the folding preparation body such that the outer circumferential edge 64a of the folding preparation body 64 is gathered to the upper side of the inflow opening 53, the outer circumferential edge may be gathered to the center of the inflow opening 53 as the embodiment. However, if the folded body 70 can be formed to include the inflow opening 53 by folding the folding preparation body such that the outer circumferential edge 64a of the folding preparation body 64 is gathered to the upper side of the inflow opening 53, the center in which the outer circumferential edge 64a of the folding preparation body 64 is gathered may be deviated from the center of the inflow opening 53 (in other words, attachment portion 54).

In the embodiment, when the folding is performed such that the outer circumferential edge 64a of the folding preparation body 64 is gathered to the upper side of the inflow opening 53, the molding surfaces 79a and 80a of the pressing tools 79 and 80 are disposed to abut on approximately the entire circumference of the outer circumferential surface 70c of the folded body 70 so as to secure the substantially columnar folded shape stably. Of course, if the outer circumferential surface 70c of the folded body 70 can be continuously or intermittently pressed in a planar state, the molding surfaces 79a and 80a of the pressing tools 79 and 80 may be disposed with being separated from each other at the time of being pressed completely.

If the folded shape of the folded body can be stabilized, the outer circumferential edge 64a of the folding preparation body 64 may be pressed to approach the inflow opening 53 from the equally radial eight places or six places evenly in a radial shape by blade-shaped (paddle-shaped) pressing tools (see JP-A-2007-261565 and US 2005/0269807 described above). In the blade-shaped (paddle-shaped) pressing tools, tips have a shape of a thin sheet, and when pressing the folding preparation body to complete the folding of the folded body, the tips become in a state of biting largely into the folded body without contacting with each other.

As the folded body 70 mounted in the boss portion B of the steering wheel W, it is not necessary to maintain the folded shape strongly, or without consideration of the recess portions 70d and 71, the compression process is simplified, or the compression process is eliminated. Thus, the folded body 70 formed only by the folding process of forming the folding preparation body 64 may be assembled to the airbag holder 21 to mount the airbag 50 in the boss portion B of the steering wheel W.

What is claimed is:

1. A folding method of a folded body of a driver seat airbag which is mounted in a steering wheel and includes an outer circumferential wall having a vehicle body side wall in which an inflow opening through which an inflation gas is allowed to flow is disposed near a center, and a driver side wall disposed to face the vehicle body side wall by connecting an outer circumferential edge to an outer circumferential edge of the vehicle body side wall, the folded body being a folding preparation body including a pre-folded portion that is provided in a front edge of an initial preparation body of the airbag in a state where the vehicle body side wall and the driver side wall are overlapped, and being folded in a folded shape of being gathered to an upper side of the inflow opening to be mountable in the steering wheel, the method comprising:
    forming the pre-folded portion in such a manner that the front edge of the initial preparation body is folded to approach the inflow opening of the vehicle body side wall, and only one crease is provided in a right and left direction; and
    folding a portion of the folding preparation body near the inflow opening in a folded shape of being gathered to an upper side of the inflow opening, the folding preparation body being provided with the pre-folded portion.

2. The folding method of the folded body of the driver seat airbag according to claim 1, wherein
    when the portion of the folding preparation body near the inflow opening is gathered to an upper side of the inflow opening, the folding preparation body is pressed and folded such that a plurality of places of the outer circumferential edge of the folding preparation body approach the inflow opening.

3. The folding method of the folded body of the driver seat airbag according to claim 2, wherein
    when the portion of the folding preparation body near the inflow opening is gathered to the upper side of the inflow opening, the folding preparation body is pressed and folded such that the crease of the folding preparation body approaches the inflow opening.

* * * * *